(12) United States Patent
Chen et al.

(10) Patent No.: US 8,413,341 B2
(45) Date of Patent: Apr. 9, 2013

(54) VEHICLE MEASUREMENT SYSTEM WITH USER INTERFACE

(75) Inventors: Darwin Y. Chen, Conway, AR (US);
Joel A. Kunert, Conway, AR (US);
Brian A. Walesa, Eagle, WI (US);
Rajani K. Pulapa, Little Rock, AR (US)

(73) Assignee: Snap-On Incorporated, Kenosha, WI (US)

( * ) Notice: Subject to any disclaimer, the term of this patent is extended or adjusted under 35 U.S.C. 154(b) by 954 days.

(21) Appl. No.: 12/494,189

(22) Filed: Jun. 29, 2009

(65) Prior Publication Data
US 2010/0328060 A1 Dec. 30, 2010

(51) Int. Cl.
*G01B 7/31* (2006.01)
*G01B 11/27* (2006.01)
(52) U.S. Cl.
USPC ............................................................ 33/288
(58) Field of Classification Search .................... 33/288, 33/600
See application file for complete search history.

(56) References Cited

U.S. PATENT DOCUMENTS

| | | | |
|---|---|---|---|
| 4,811,250 A | 3/1989 | Steber et al. | |
| 6,115,927 A | 9/2000 | Hendrix | |
| 7,046,838 B1 | 5/2006 | Sakagawa et al. | |
| 7,062,861 B2 * | 6/2006 | O'Mahony et al. | 33/286 |
| 7,307,737 B1 * | 12/2007 | Kling et al. | 356/614 |
| 7,937,198 B2 * | 5/2011 | Brozovich et al. | 701/33.4 |
| 2005/0151963 A1 | 7/2005 | Pulla et al. | |
| 2006/0111797 A1 | 5/2006 | Saito et al. | |
| 2011/0102581 A1 * | 5/2011 | Nakamura et al. | 348/135 |
| 2011/0302795 A1 * | 12/2011 | Nobis et al. | 33/288 |

FOREIGN PATENT DOCUMENTS

| | | |
|---|---|---|
| EP | 0598809 | 1/1994 |
| JP | 10-047935 | 2/1998 |
| WO | WO 2009/143319 A1 | 11/2009 |

OTHER PUBLICATIONS

Snap-on Equipment —Blackhawk, "Get Your Shark Measuring System Today!", 2005, 4 pgs.
Notification of Transmittal of the International Search Report and the Written Opinion of the International Searching Authority Issued in International Patent Application No. PCT/US2009/049127 dated Mar. 31, 2010.

* cited by examiner

*Primary Examiner* — G. Bradley Bennett
(74) *Attorney, Agent, or Firm* — McDermott Will & Emery LLP

(57) ABSTRACT

A vehicle measurement system that provides highly realistic guidance to perform a vehicle measurement procedure is described. An exemplary system includes a data storage device configured to store vehicle data for a plurality of vehicles. The vehicle data corresponding to each respective vehicle includes an image of the vehicle and information of predefined points on the vehicle to which emitters or targets should be attached for performing a vehicle measurement procedure. A user interface is provided to receive a user input identifying a vehicle under test. After the user identifies a vehicle under test, the system retrieves vehicle data corresponding to the vehicle under test from the data storage device; and displays the image of the vehicle under test on the display with the predefined points on the vehicle identified.

21 Claims, 10 Drawing Sheets

VEHICLE MEASUREMENT SYSTEM WITH USER INTERFACE

FIELD OF DISCLOSURE

This disclosure relates to an automotive service system, more specifically, to a system for measuring spatial characteristics of a vehicle, such as an alignment condition of a vehicle frame, with an interactive user interface providing highly useful and interactive visual information to assist a technician in performing needed setup and procedures for a measurement.

BACKGROUND AND SUMMARY OF THE DISCLOSURE

In performing collision repairs or vehicle damage diagnosis reporting, automotive service facilities use measurement systems to measure spatial characteristics of a vehicle body or frame, and determine whether such measured characteristics meet specification requirements. Generally, these measurement systems, through the use of various types of detection techniques, establish three-dimensional positions of a set of points of interest on a vehicle body and determine if there is any deviation from specification data corresponding to the vehicle under test. If such deviation exceeds a pre-specified percentage or value, additional procedures, such as frame straightening, need to be performed to correct the deviations.

For example, Blackhawk® Shark, a computerized measuring system made by Snap-on Incorporated, utilizes ultrasound technologies to determine spatial characteristics of a vehicle frame. Ultrasound emitters are attached to various pre-specified points on a vehicle. A calibrated array of high frequency microphones located in a sensor beam is provided to receive probe signals sent by the emitters. From detection of transmission times, positions of the emitters are found. A console computer computes spatial characteristics of the vehicle frame or body according to the received ultrasound signals. Details for using ultrasound signals to measure spatial characteristics of a vehicle frame are described in, for example, European Patent No. EP 0598809 B1, entitled "VEHICLE SHAPE DETERMINATION SYSTEM," the disclosure of which is incorporated herein by reference.

Other types of measurement systems use laser or light emitters, instead of ultrasound, to determine spatial characteristics of a vehicle frame. U.S. Pat. No. 6,115,917, entitled "MEASUREMENT DEVICE PRIMARILY FOR USE WITH VEHICLES," and U.S. Pat. No. 4,811,250, entitled "DEVIATION MEASUREMENT SYSTEM," describe examples of using light or laser emitters installed at pre-defined locations of a vehicle to determine spatial characteristics of a vehicle frame based on the light or laser signals received by one or more sensors. The entire disclosures of U.S. Pat. Nos. 6,115,917 and 4,811,250 are incorporated herein by reference. Still another type of measurement systems determine spatial characteristics of a vehicle frame or body by using one or more cameras to capture images of targets attached to pre-defined points on a vehicle. Relative positions between the cameras are known. Spatial characteristics of the pre-defined points and the vehicle frame are determined based on the captured images of the targets and the known relative positions of the cameras.

In the types of measurement systems described above, pre-defined points or locations where emitters or targets should be attached are specified for each vehicle. It is critical that emitters or targets are correctly installed at or affixed to the pre-defined points or locations on the vehicle such that a meaningful comparison may be made between the specification data and the measured spatial characteristics of the vehicle under test. However, vehicles needing collision repairs often are seriously disfigured or deformed and a correct identification of the pre-defined points is difficult without proper guidance or reference images. In the past, conventional collision repair systems or measurement systems identify those points of interest by displaying static line art graphics with pre-defined points identified. FIG. 1 shows a line art graphic for a vehicle frame identifying various predefined points. This type of line art graphics, while helpful, lacks important details that are critical to vehicle survey and damage identifications. Furthermore, line art graphics are less intuitive and harder to relate to the vehicle under repair, especially when the vehicle is severely damaged.

Accordingly, there is a need for effective guidance to a technician in performing a process for measurement process. There is also a need for highly accurate and realistic visual representations identifying the locations of pre-defined points on each vehicle.

This disclosure describes embodiments of vehicle measurement systems that provide realistic and highly useful visual guidance and information identifying predefined points that are critical to the performance of a measurement procedure. Different formats of depictions or images of a vehicle under test may be presented to a user based on a user selection. Multiple depictions or images may be displayed at the same time, depending on a user's preference, to assist the performance of the measurement procedure.

According to one embodiment, an exemplary vehicle measurement system includes a data storage device configured to store vehicle data for a plurality of vehicles, and a user interface configured to receive a user input identifying a vehicle under test. The vehicle data corresponding to each respective vehicle includes an image of the vehicle and information of predefined points on the vehicle to which emitters or targets should be attached for performing a vehicle measurement procedure. A data processor which, upon execution of instructions stored in the data storage device, controls the system to retrieve vehicle data corresponding to the vehicle under test from the data storage device; and display the image of the vehicle under test on the display with the predefined points on the vehicle identified. The vehicle data may include a video image of the vehicle or a photograph of the vehicle. A selection may be provided allowing a user to magnify a portion of the displayed image or zoom in the displayed image. The system may further includes a plurality of sensors configured to sense signals emitted by the emitters or images of the targets attached to the predefined points of the vehicle. The system determines determine spatial characteristics of the vehicle under test based on the sensed signals or target images from the sensors.

In one aspect, the vehicle data may include a line art graphic of the vehicle, and the data processor, upon execution of the instructions stored in the data storage device, further controls the system to concurrently display the image of the vehicle and the line art graphic of the vehicle on the display. The image of the vehicle and the line art graphic may be displayed in an overlay manner. The system may further provide an opacity selection allowing a user to select a manner that the overlay image and line art graphic should be displayed; and display the overlay image and line art graphic according to the opacity selection made by the user through the user interface. In another aspect, the vehicle data include at least two line art graphics showing different degrees of details of the vehicle. According to still another aspect, a first portion of the vehicle is displayed as the image of the vehicle and a second portion of the vehicle is displayed as the line art graphic. The system may provide a selection allowing a user to select the desirable first portion and the desirable second portion of the vehicle; and display the vehicle according to the election made by the user through the user interface.

It is understood that systems and methods described herein may be implemented using one or more computer systems and/or appropriate software. It is also understood that embodiments, steps and/or features described herein can be performed, utilized, implemented and/or practiced either individually or in combination with one or more other steps, embodiments and/or features.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout and wherein.

DETAILED DESCRIPTIONS OF ILLUSTRATIVE EMBODIMENTS

Figure 1:
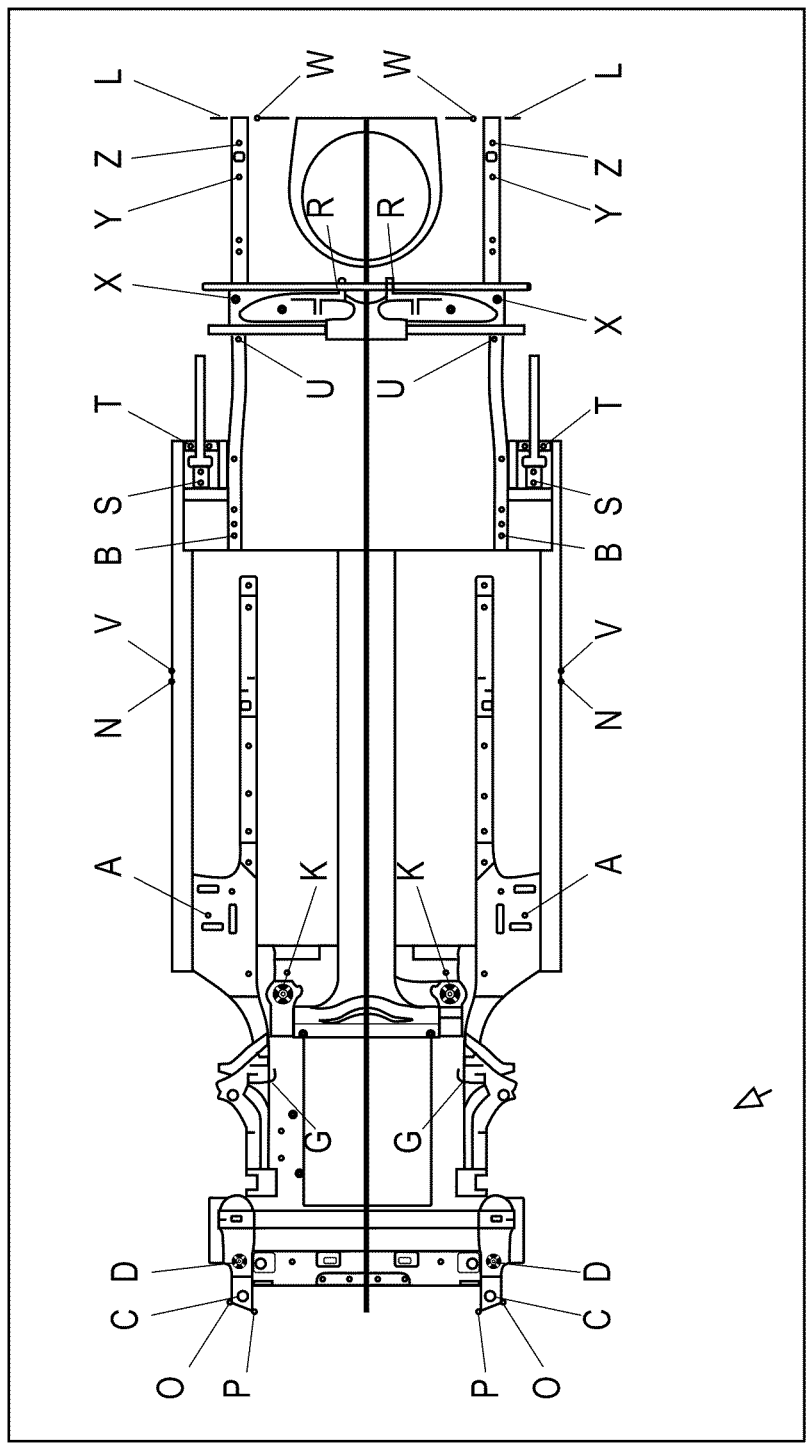
FIG. 1 is a prior art line art graphic of a vehicle.

In the following description, for the purposes of explanation, numerous specific details are set forth in order to provide a thorough understanding of the present disclosure. It will be apparent, however, to one skilled in the art that concepts of the disclosure may be practiced or implemented without these specific details.

An exemplary vehicle measurement system according to this disclosure includes multiple emitters or targets for attached to predefined points or locations of a vehicle. One or more sensors are provided to receive signals or lights emitted by the emitters or lights reflected by the targets. It is understood that the emitters may produce signals in different forms, such as electromagnetic signals, visible or invisible lights, sound signals, ultrasound signals, etc. It is further understood that suitable sensors should be selected for use with specific type of emitters and/or targets. For example, if emitters emit infrared ray signals, suitable cameras with the capabilities should be used to sense the infrared ray signals emitted by the emitters. The exemplary system includes a data processing system, such as a computer, to compute spatial characteristics of the emitters/targets and predefined points on the vehicle based on the signals received by the sensors. For example, the predefined points on the vehicle under test are mapped to a coordinate system. Based on the coordinates of the predefined points, spatial characteristics of the frame of the vehicle under test are determined. Examples of the spatial characteristics include alignment conditions, positions, angles, lengths, thickness, curvature, etc. The spatial characteristics of the vehicle under test are then compared with specification data or reference data including spatial characteristics of a similar vehicle in normal condition. Deviations from the reference data beyond an acceptable percentage or range suggest that the vehicle under test needs repair or further inspection. Details of vehicle measurements systems are described in European Patent No. EP 0598809 B1, U.S. Pat. No. 6,115, 917, and U.S. Pat. No. 4,811,250, all of which are previously incorporated by reference.

An exemplary vehicle measurement system according to this disclosure includes a user interface that provides highly realistic and interactive images of vehicle under test, with the pre-defined points clearly identified. Good presentation of the vehicle in the user interface is crucial in vehicle collision repair instrumentation process as the vehicle being measured is often severely damaged and the identification of the points of interests can be difficult and time consuming. Points inaccurately or mistakenly identified may lead to improper repair and sometimes unsalvageable damages to the vehicle.

According to one embodiment of this disclosure, the user interface provides on-screen guidance including one or more photo images or realistic images of a vehicle under test, with the predefined points clearly identified. A data storage device, such as a hard disk drive or DVD ROM, stores vehicle data corresponding to different makes and models. The data storage device may be local or remote to the measurement system. The vehicle data includes one or more photo images for each respective vehicle and information of corresponding pre-defined points to which emitters and/or targets should or may attach.

During a measurement process, a user identifies a vehicle under test by entering corresponding information of the vehicle or by selecting from a list of vehicles showed on a display of the system. In response to the input entered by the user, the system accesses vehicle data corresponding to the identified vehicle. In one embodiment, one or more photo images corresponding to the vehicle under test are displayed to the user. The photo images may correspond to one or more viewing angles of the vehicle. The vehicle data may include photo images showing different degrees of details of a corresponding vehicle. For example, one of the photo images may correspond to only a frame of a vehicle under test (a "mech-out" photo image), and another photo image may show the vehicle frame with additional parts, such as transmission systems, suspension systems, muffler, etc. (a "mech-in" photo image). In one embodiment, an under view of an entire vehicle is displayed. The photo images may or may not be displayed with the predefined points identified.

Figure 2:
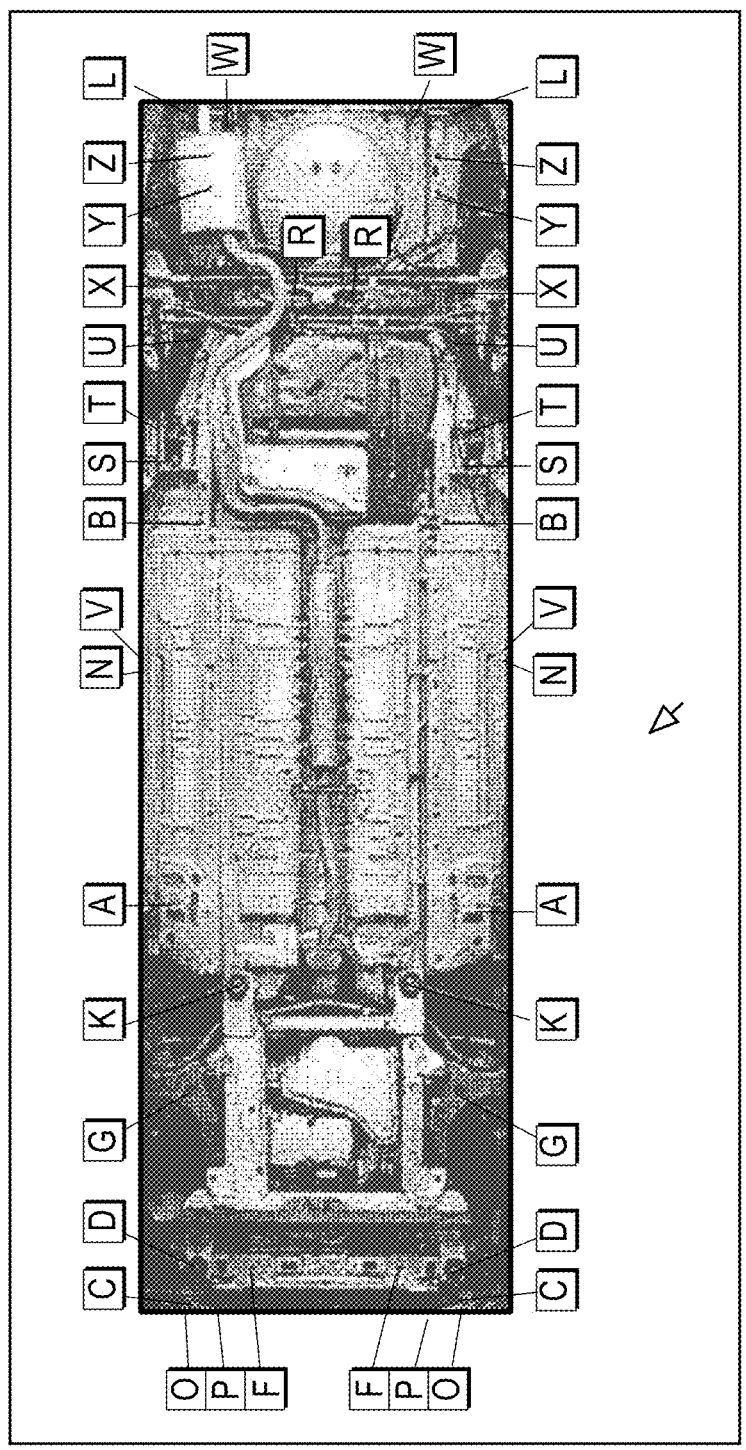
FIGS. 2-6 show an exemplary screen display of an under view of a vehicle.

FIG. 2 shows an exemplary screen display of an under view of a vehicle. Unlike the line art graphic in FIG. 1, the exemplary system provides a realistic sense of what the under view of the vehicle should look like and where the predefined points are located. Each button linking to each predefined point includes embedded or hidden information which, upon suitable operation by a user, may be revealed to provide further guidance with respect to that specific point or location. For example, each button may be clickable to reveal a window providing additional information associated with a corresponding point linking to the button. For example, the additional information may include descriptions of the location of the predefined point, parts that need to be removed in order to access a specific point, special tools or accessories needed for accessing or reaching the point, characteristics of the predefined point, information on adapters required to attach emitters or targets to the point, or significant visible features of nearby parts that may assist identification of the point of interest.

Figure 3:
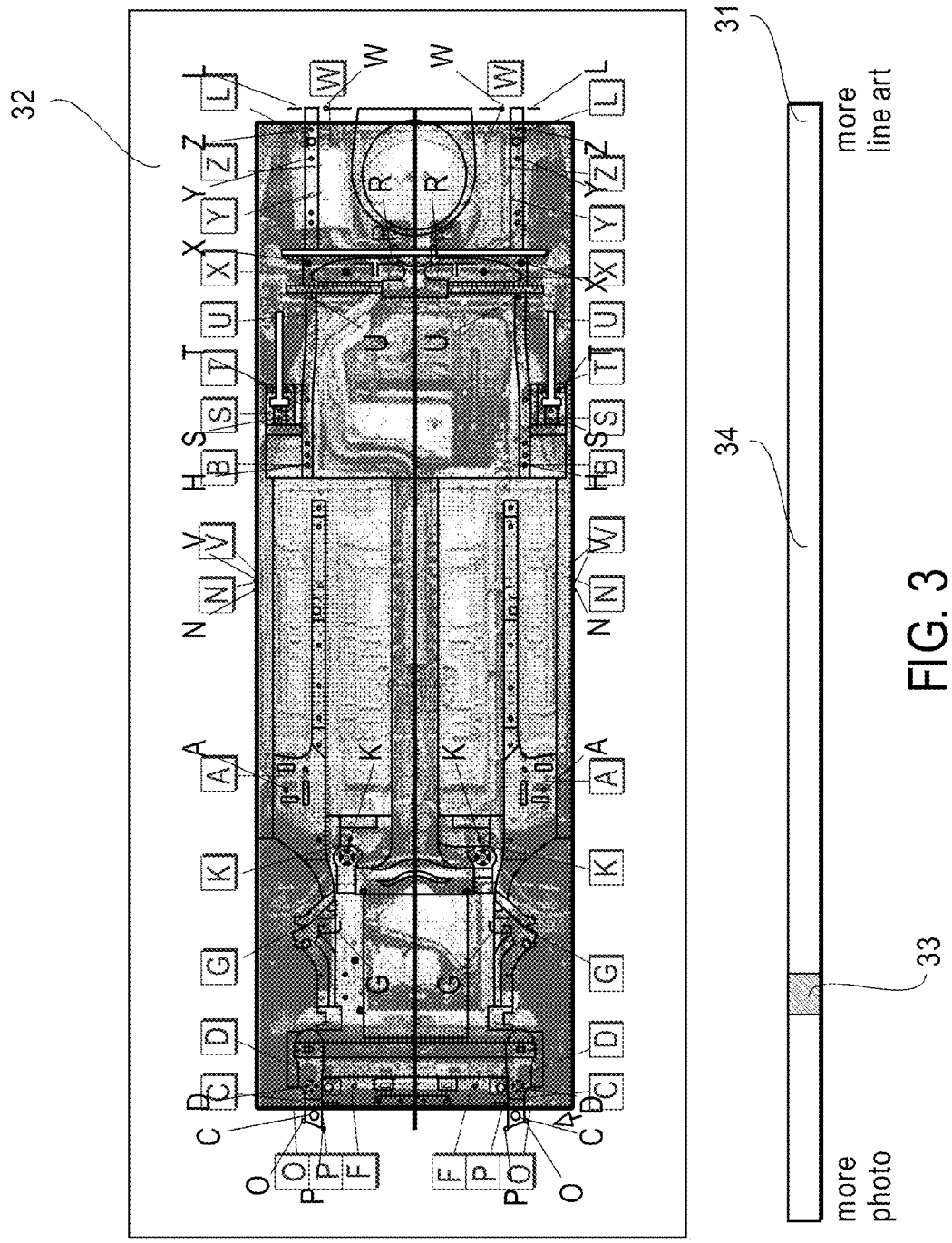

According to an embodiment of this disclosure, an exemplary measurement system concurrently displays an image of the vehicle and a line art graphic of the vehicle on a display, to assist technicians performing a measurement process. FIG. 3 shows another exemplary screen shot of the user interface of the exemplary system that allows a user to view a photo image of the vehicle and line art graphics at the same time in a semi-transparent or semi-opaque manner. In area 32, a photo image of the under view of the vehicle and a line art graphic are overlaid and displayed in a semi-transparent or semi-opaque manner. A user control 31 is provided allowing a user to adjust a degree of transparency or opacity of the photo image in area 32. The user may use a mouse cursor to select and drag button 33 on the sliding scale 34. If button 33 moves towards the end marked with "more photo," the transparency of the photo image is reduced, and the photo image of the vehicle is displayed more prominently than the line art graphic. When button 33 is positioned at left end of sliding scale 34, area 32 displays only the photo image of the vehicle, but not the corresponding line art graphic. On the other hand, if button 33 slides towards the end marked with "more line art," the transparency of the photo image is increased, and the visibility of the underlying line art graphic increases. When button 33 is positioned at the right end of sliding scale 34, area 32 displays only the line art graphic of the vehicle, but not the photo image.

This unique overlay display and convenient user control allow the user to decide what visual information would best help the identification of the predefined points on the vehicle under test. Some desired pre-defined points or points requiring adjustments or measurements may not be visible in the photo image. These points may be visually obstructed by shields or hidden under other components on the vehicle. The user interface as shown in FIG. 3 allows a user to control the suitable opacity or transparency of the photo image and expose more or less of the underlying line art graphic to assist the user better locating the predefined points.

Figure 4:
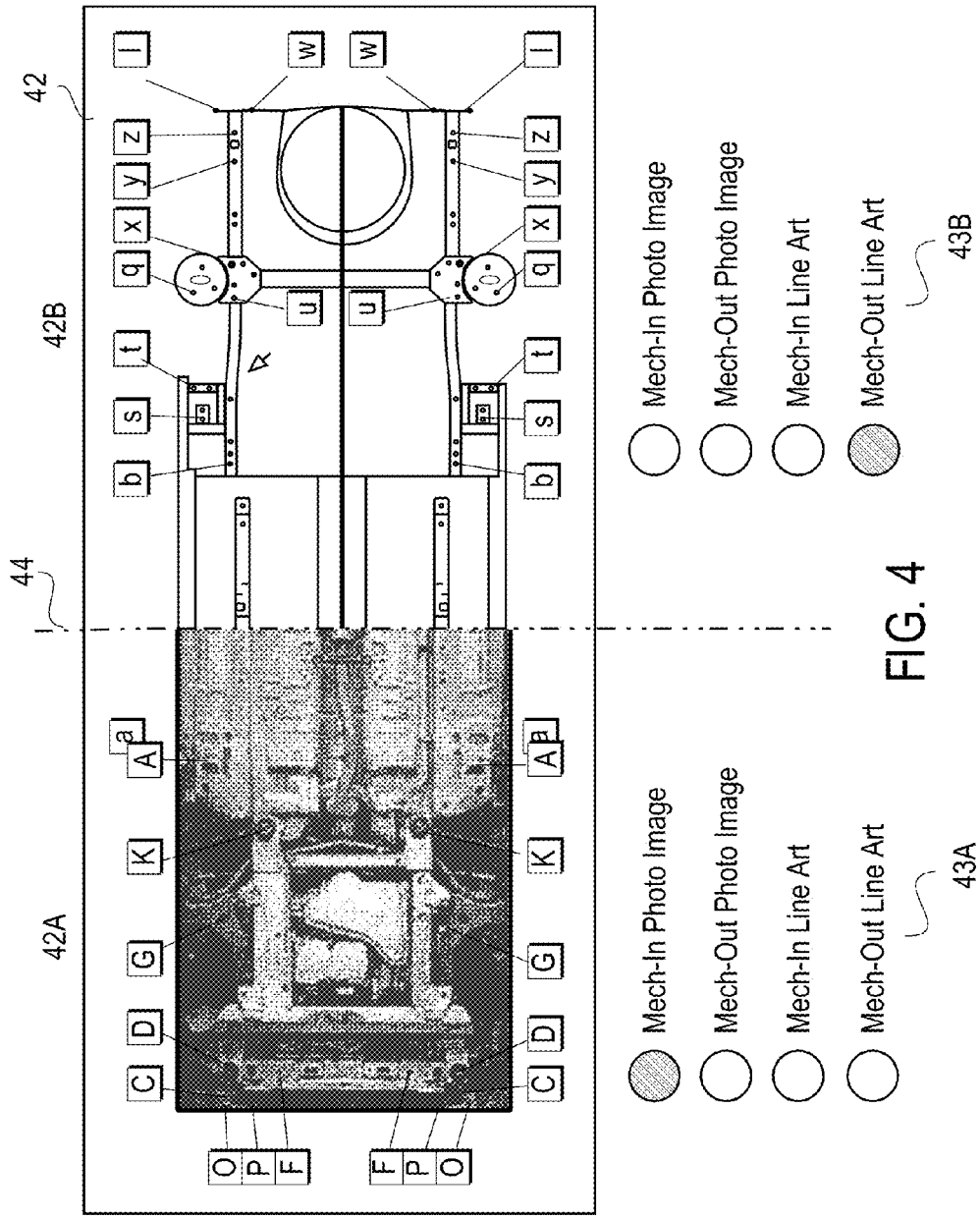

FIG. 4 illustrates another example of screen display of the exemplary measurement system. In FIG. 4, display area 42 is divided into two portions 42A and 42B. The user may use a mouse courser to select and drag the dividing line 44 to change the proportions of areas 42A and 42B.

Figure 4A:
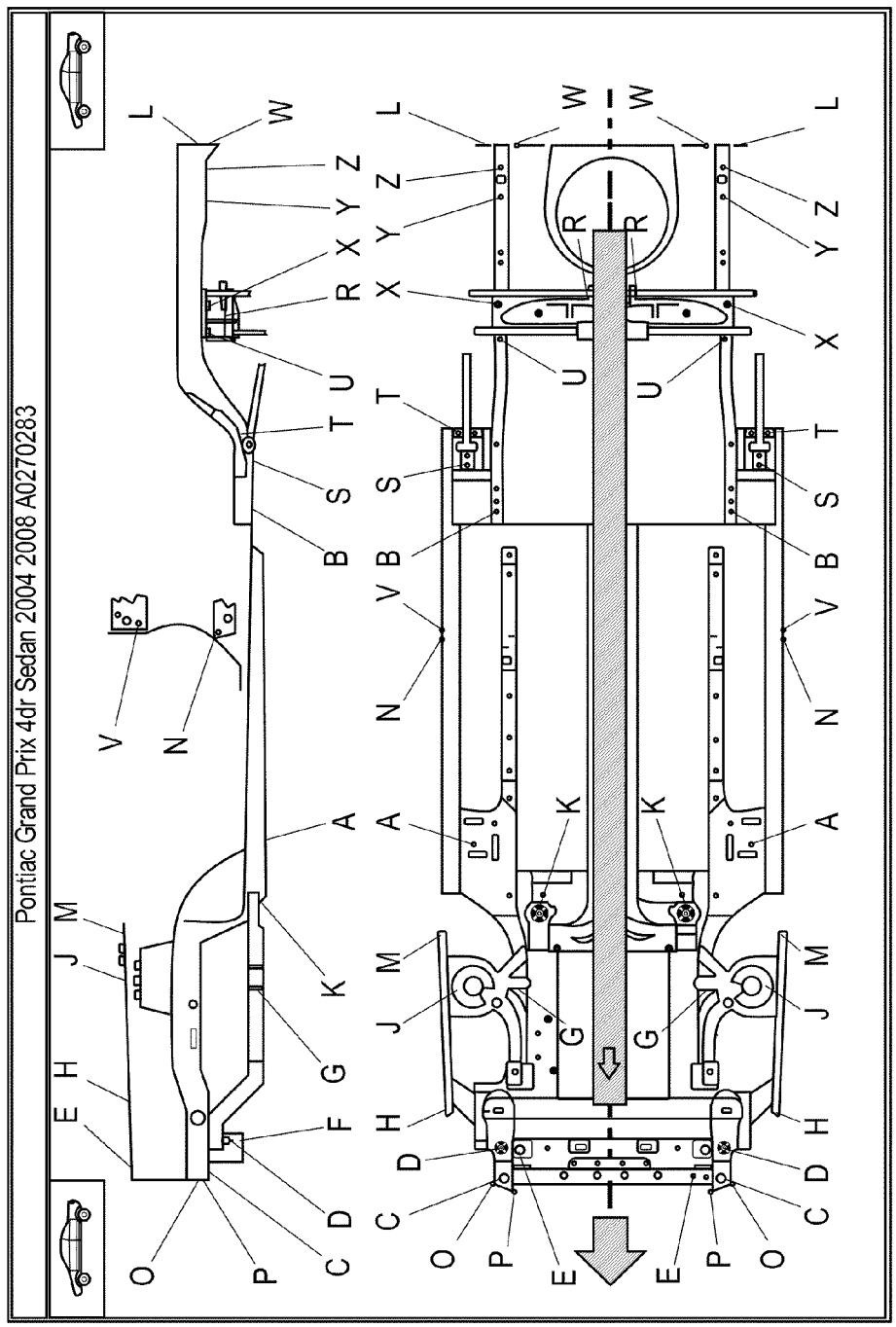
Figure 4B:
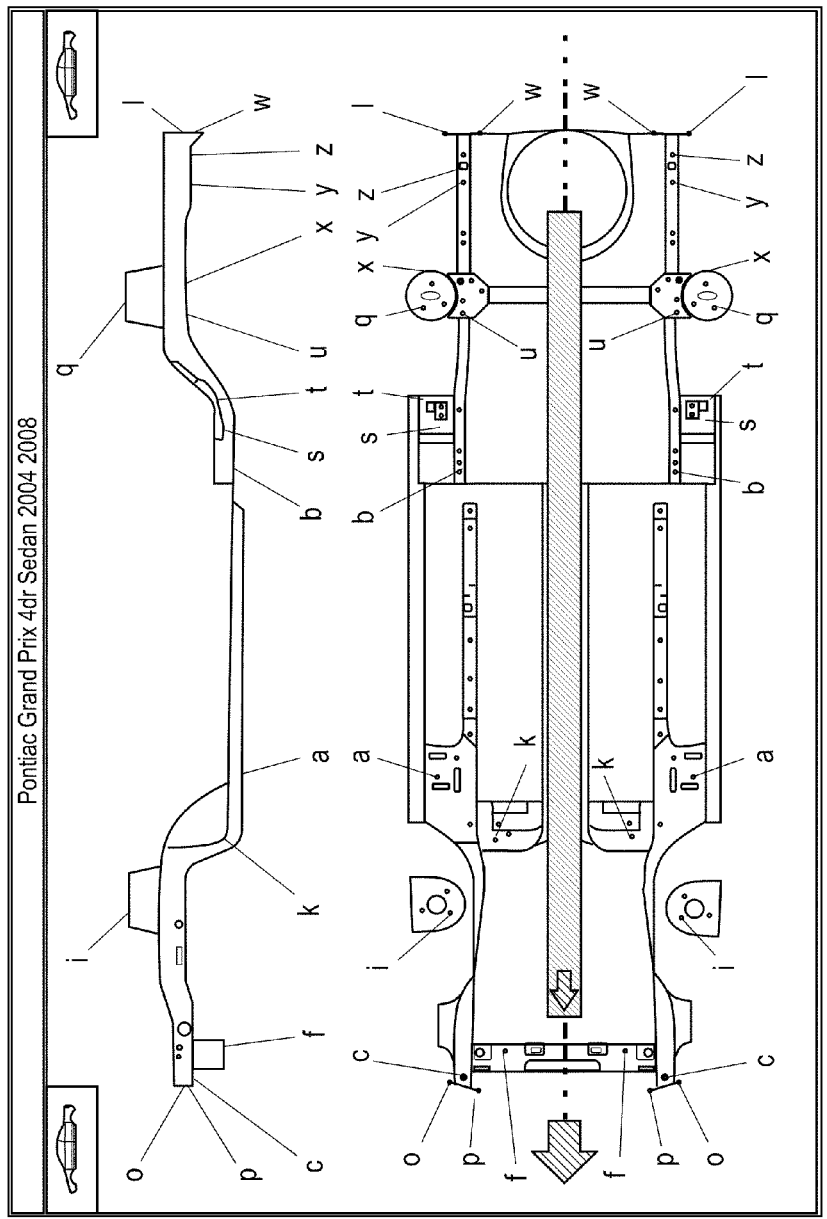

In display area 42A, a photo image corresponding to that portion of the vehicle is displayed, while in display area 42B, a line-art graphic of the corresponding portion of the vehicle is displayed. Each display area 42A, 42B is provided with a user selection control 43A, 43B, respectively, allowing a user to select what format of image should be displayed in the corresponding display area. For example, user selection control 43A provides four types of display format: a mech-in photo image, a mech-out photo image, mech-in line art and mech-out line art. A photo image provides a photograph of the corresponding portion of the vehicle. A mech-out photo image corresponds to only a frame of a vehicle under test, and a mech-in photo image shows the vehicle frame with additional parts, such as transmission systems, suspension systems, muffler, etc. Similarly, mech-in line art is a line-art depiction of the vehicle frame with attached mechanical parts, such as the suspension system, and mech-out line art is a line-art graphic showing only the vehicle frame without additional mechanical parts. Examples of mech-in and mech-out line art graphics are shown in FIGS. 4A and 4B, respectively.

By making proper selections of display areas 42A and 42B, the user can retrieve suitable information from the user interface that is most appropriate to the undergoing measurement process or the condition of the vehicle. For example, a vehicle under test may have a portion corresponding to display area 42B with all parts removed from the vehicle frame, and a portion corresponding to display area 42A remains intact and undamaged. Under such circumstance, a photo image in area 42A and a mech-out line art display in area 42B may best help the technician in identifying the pre-defined points.

Figure 5:
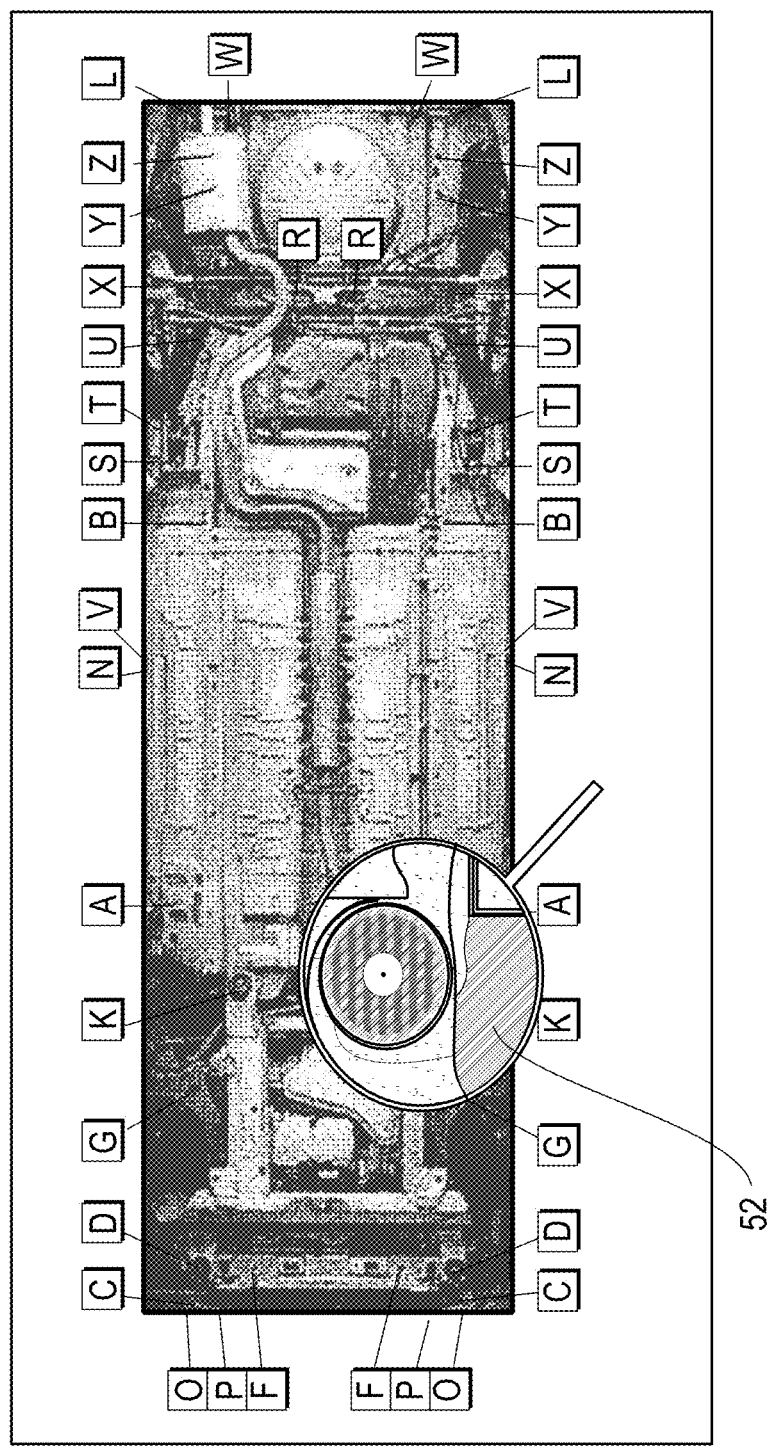
Figure 6:
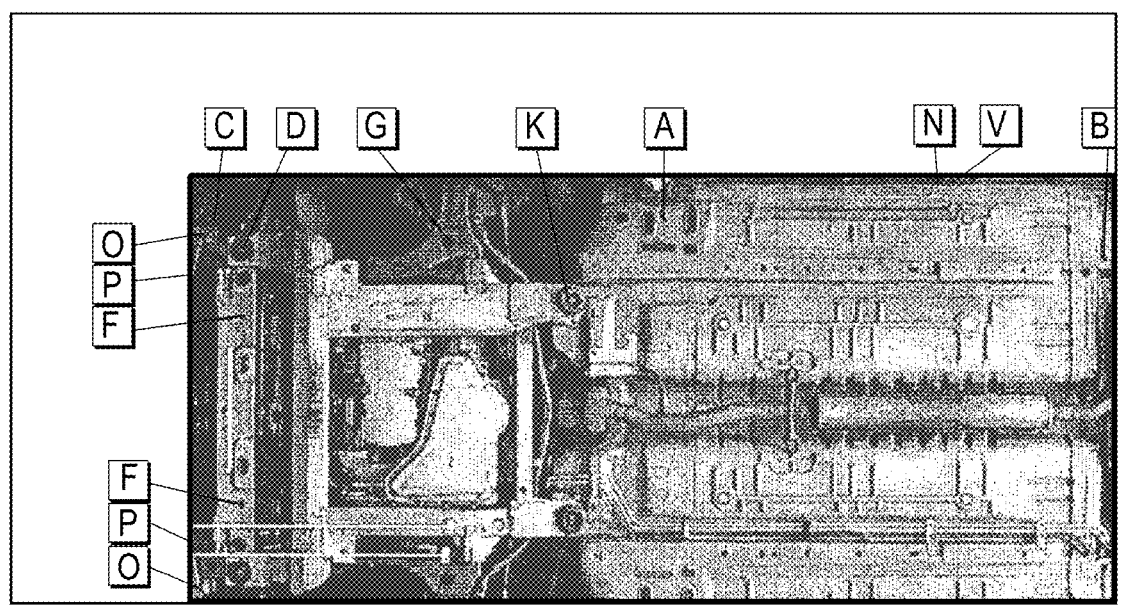

FIG. 5 shows another function of the user interface of the exemplary system. In FIG. 5, a "magnifying glass" function is provided allowing a user to magnify portions of the display by moving a magnify glass 52 onto a select portion of the display which enables a more detailed view of the portion without affecting the rest of the display. FIG. 6 illustrates a zoom-in function provided of the user interface which creates a larger view of the display shown in FIG. 2.

Exemplary steps for creating the unique user interface are now described. The exemplary system utilizes WPF (Windows Presentation Foundation) and XAML (Extensible Application Markup Language) to create the unique graphic user interface. WPF is a graphical subsystem in the .NET Framework developed by Microsoft to enable rich user interface development. XAML is a declarative XML-based language created by Microsoft used to define user interface elements, data binding, events, and other features. XAML is a text file that can be rendered and displayed with the correct tools.

High resolution photo images of brand new vehicles are created. These images may be created by stitching partial photos of vehicles using software applications, such as Adobe Photoshop. It is understood that the images may be taken from different viewing angles of the vehicle and may be stored in different formats, such as JPEG, RAW, etc. It is also understood that computer-generated images or renderings with high levels of accuracy and resemblance of a real vehicle may be used instead of the photo images.

The images are then cropped to match the size of the corresponding conventional line art graphics. Conventional line art graphics often are created using by computer-aided design programs, such as AutoCAD. These programs, while useful in processing depictions comprising lines, circles, blocks, etc., are not quite suitable for manipulating or processing image data. Files created by AutoCAD often are not directly useable or accessible by image processing software or multimedia publishing software, such as Microsoft Expression Studio, that are used for processing and manipulating image data. A set of scaling unit conversion between the image and the corresponding line art graphics is established to ensure that once laid over, the image and the line art graphics will align perfectly. For example, in line art graphics files, which were created by AutoCAD, a unit of measurement is a millimeter, while in image files, which were manipulated and processed using Microsoft Expression Studio, a unit of measurement is a pixel. A suitable scaling unit conversion between millimeters and pixels has to be applied to properly align the line art graphic and the image when they are overlaid, and to ensure that the pre-defined points on the line art graphic and the image overlap properly.

Figure 7:
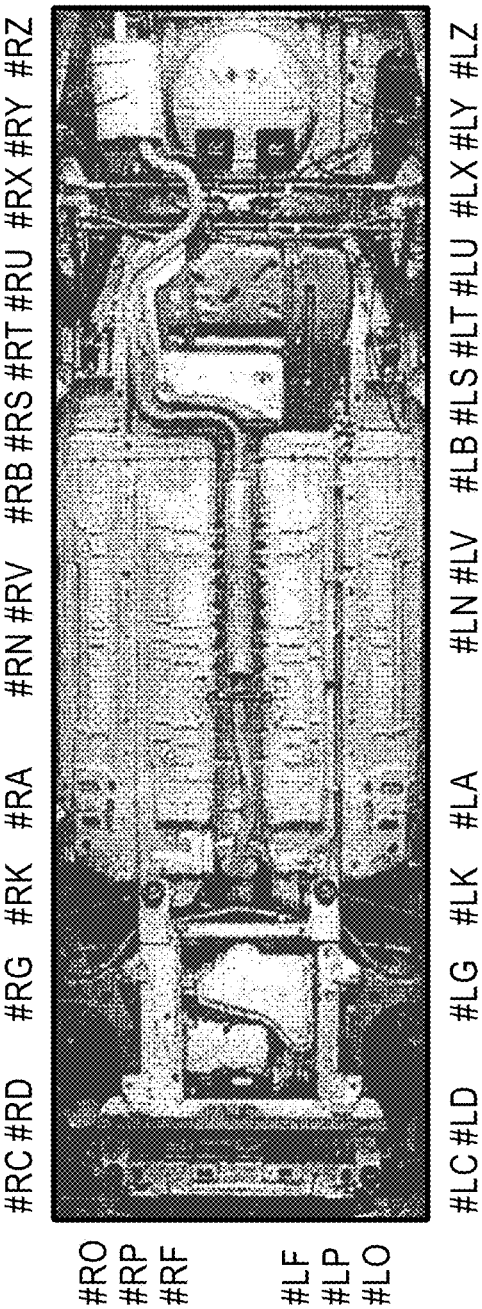
FIG. 7 is an exemplary XAML file.

For every vehicle view, a XAML file is created declaring a photo image of a vehicle and various interface elements such as points, centerlines, text blocks, place holders for associated buttons, etc. An XML file associated with the XAML file is created. The XML file specifies values of elements (such as sizes and fonts of the text blocks, etc.) in the XAML file. FIG. 7 shows an exemplary rendered XAML file corresponding to FIG. 2. As shown in FIG. 7, the rendered XAML file includes one or more photo images of a vehicle and placeholders for text buttons. Related line art graphic may be specified in the XAML file. For line art graphics, the corresponding XAML file includes a file of the line art graphics and placeholders for text buttons, if applicable.

In order to generate the XML file associated with each XAML file, a proprietary tool may be created to read and parse each XAML file and save the necessary data to an XML file.

When application software on the exemplary system is launched, these XAML and XML files are deployed to dynamically re-create the desired view of the vehicle. The application software uses information from the XAML file to create a canvas containing the vehicle photo image and/or line art graphic. Application software then reads the data from the XML file associated with the XAML file and builds the text buttons in the appropriate locations of the image or line art graphic. Application software connects the points in the graphic and the corresponding text buttons to draw the leader line as shown FIG. 2.

Additional functions and/or different illustrations, such as those described relating to in FIGS. 3-6 are implemented using various controls and/or commands under WPF. For example, the function to change opacity value as illustrated in FIG. 3 may be achieved by specifying an opacity value between 0 (fully transparent)-100 (zero transparency) in WPF's canvas control. The user interface illustrated in FIG. 4 may be implemented by manipulation of the width property of WPF's canvas control that has a range from zero (totally peeled) to x (full size of the canvas). The magnifying function illustrated in FIG. 5 may be implemented by defining a circular area for the magnifier that has a fixed magnifying property. The circular area can move across the canvas to enhance the portion of the graphic. The zoom-in/zoom-out feature shown in FIG. 6 may be implemented by manipulating of the scaling property of WPF's canvas control that may go from less than the real size (<100%) to magnified result (x00%). While specific examples using WPF and XAML are described, it is understood different software tools may be used to implement the inventions described herein without deviating from the scope of this disclosure.

Figure 8:
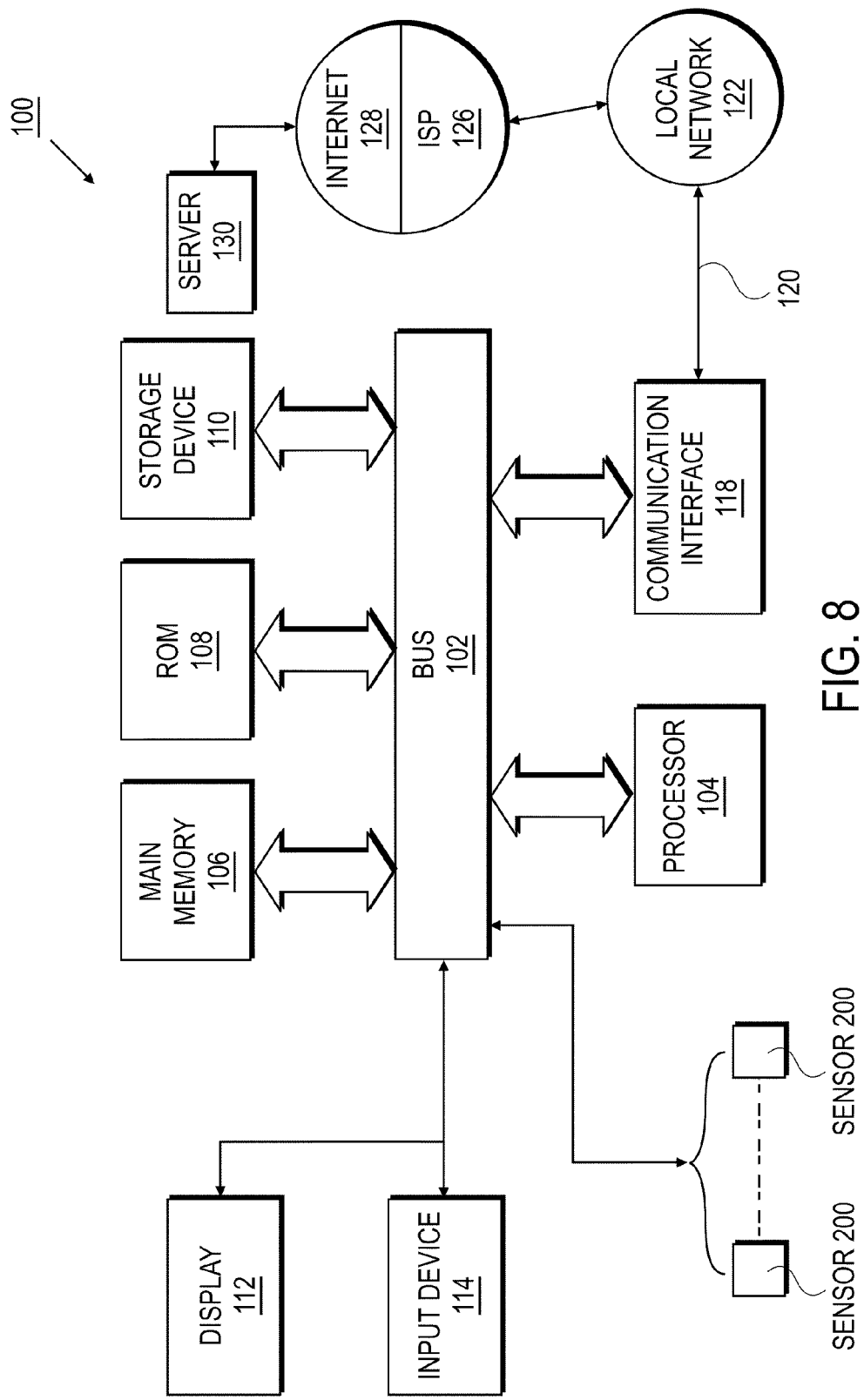
FIG. 8 is a block diagram of an exemplary data processing system upon which an exemplary measurement system may be implemented.

FIG. 8 is a block diagram that illustrates a computer system 100 upon which an exemplary measurement system of this disclosure may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

One or more sensors 200 are coupled to bus 102 via connection ports, such as a USB port, for transmitting data representing sensed signals to computer system 100. The data is stored in storage device 110 and processed by processor 104 to determine spatial characteristics of a vehicle under test based on the sensed signals with respect to the predefined points.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

According to one embodiment of the disclosure, specific steps are performed by computer system 100 in response to processor 104 executing one or more sequences of one or more instructions contained in main memory 106 or storage device 110, or received from the network link 120. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the disclosure. Thus, embodiments of the disclosure are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. A system comprising:
    a data storage device configured to store vehicle data for a plurality of vehicles, wherein the vehicle data corresponding to each respective vehicle includes an image of the vehicle, the image including a video image or a photograph of the vehicle;
    a user interface configured to receive a user input identifying a vehicle under test;
    a display;
    a data processor which, upon execution of instructions stored in the data storage device, controlling the system to:
    retrieve vehicle data corresponding to the vehicle under test from the data storage device; and
    display the image of the vehicle under test on the display;
    wherein the vehicle data includes information of predefined points on the vehicle to which emitters or targets may be attached for performing a vehicle measurement procedure, and the image of the vehicle is displayed with the predefined points identified.

2. The system of claim 1, wherein the image is a non-line art graphic image of the vehicle.

3. The system of claim 1, wherein:
    the vehicle data include a line art graphic of the vehicle; and
    the data processor, upon execution of the instructions stored in the data storage device, further controls the system to concurrently display the image of the vehicle and the line art graphic of the vehicle on the display.

4. The system of claim 3, wherein the image of the vehicle and the line art graphic are displayed in an overlay manner.

5. The system of claim 4, wherein the data processor, upon execution of the instructions stored in the data storage device, further controls the system to:
    provide an opacity selection allowing a user to select a manner that the overlay image and line art graphic should be displayed; and
    display the overlay image and line art graphic according to the opacity selection made by the user through the user interface.

6. The system of claim 3, wherein vehicle data include at least two line art graphics showing different degrees of details of the vehicle.

7. The system of claim 1, wherein the vehicle data include at least two images of the vehicle showing different degrees of details of the vehicle.

8. The system of claim 3, wherein a first portion of the vehicle is displayed in as the image of the vehicle and a second portion of the vehicle is displayed in the line art graphic.

9. The system of claim 8, wherein the data processor, upon execution of the instructions stored in the data storage device, further controls the system to:
    provide a selection allowing a user to select the desirable first portion and the desirable second portion of the vehicle; and
    display the vehicle according to the election made by the user through the user interface.

10. The system of claim 1, wherein the data processor, upon execution of the instructions stored in the data storage device, further controls the system to provide a selection allowing a user to magnify a portion of the displayed image or zoom in the displayed image.

11. The system of claim 1 further comprising a plurality of sensors configured to sense signals emitted by the emitters or images of the targets attached to the predefined points of the vehicle;
    wherein the data processor, upon execution of the instructions stored in the data storage device, further controls the system to:
    receive the sensed signals or images from the sensors; and
    determine spatial characteristics of the vehicle under test based on the received signals.

12. A vehicle measurement method for use in a vehicle measurement system, the system includes a user interface configured to receive a user input, a display and a data processor, the method comprising:
    receiving an input from the user interface identifying a vehicle under test;
    retrieve vehicle data corresponding to the vehicle under test, wherein the vehicle data corresponding to the vehicle under test include an image of the vehicle, the image including a video image or a photograph of the vehicle; and displaying the image of the vehicle under test on the display;

wherein the vehicle data includes information of predefined points on the vehicle to which emitters or targets may be attached for performing a vehicle measurement procedure using the vehicle measurement system, and the image of the vehicle is displayed with the predefined points identified.

13. The method of claim 12, wherein the image is a non-line art graphic image of the vehicle.

14. The method of claim 12, wherein:

the vehicle data include a line art graphic of the vehicle; and the data processor, upon execution of the instructions stored in the data storage device, further controls the system to concurrently display the image of the vehicle and the line art graphic of the vehicle on the display.

15. The method of claim 14, wherein the image of the vehicle and the line art graphic are displayed in an overlay manner.

16. The method of claim 15 further comprising:

providing an opacity selection allowing a user to select a manner that the overlay image and line art graphic should be displayed; and displaying the overlay image and line art graphic according to the opacity selection made by the user through the user interface.

17. The method of claim 14, wherein vehicle data include at least two line art graphics showing different degrees of details of the vehicle.

18. The method of claim 12, wherein the vehicle data include at least two images of the vehicle showing different degrees of details of the vehicle.

19. The method of claim 14, wherein a first portion of the vehicle is displayed in as the image of the vehicle and a second portion of the vehicle is displayed in the line art graphic.

20. The method of claim 19 further comprising:

providing a selection allowing a user to select the desirable first portion and the desirable second portion of the vehicle; and displaying the vehicle according to the selection made by the user through the user interface.

21. The method of claim 12 further providing a selection allowing a user to magnify a portion of the displayed image or zoom in the displayed image.

* * * * *